United States Patent [19]

Maucher et al.

[11] 4,426,915
[45] Jan. 24, 1984

[54] FLUID-OPERATED SERVOMOTOR FOR ACTUATION OF CLUTCHES OR THE LIKE

[75] Inventors: Paul Maucher, Sasbach; Oswald Friedmann, Lichtenau; Johann Jäckel, Bühl, all of Fed. Rep. of Germany

[73] Assignee: Luk Lamellen und Kupplungsbau GmbH, Bühl, Fed. Rep. of Germany

[21] Appl. No.: 261,292

[22] Filed: May 7, 1981

[30] Foreign Application Priority Data

May 23, 1980 [DE] Fed. Rep. of Germany ....... 3019752

[51] Int. Cl.³ .............................................. F01B 9/00
[52] U.S. Cl. ........................................... 92/29; 92/30; 92/99; 92/101; 403/DIG. 8; 192/111 A; 192/85 V; 188/196 P
[58] Field of Search ............. 92/14, 29, 30, 94, 98 D, 92/99, 101, 103 S D, 85 R, 129; 403/DIG. 8, 328; 192/111 A, 85 V; 188/196 P, 67

[56] References Cited

U.S. PATENT DOCUMENTS

| | | | |
|---|---|---|---|
| 1,975,147 | 10/1934 | Hartdorn | 92/14 |
| 2,138,169 | 11/1938 | Hunt | 192/70.27 |
| 2,385,517 | 9/1945 | Hunt | 192/70.29 |
| 2,516,018 | 7/1950 | Peterson et al. | 92/29 |
| 2,835,366 | 5/1958 | Häussermann | 192/70.28 |
| 3,016,120 | 1/1962 | Häussermann et al. | 192/70.28 |
| 3,323,624 | 6/1967 | Maurice | 192/89 B |
| 4,167,897 | 9/1979 | Bunyard | 92/136 |
| 4,192,220 | 3/1980 | Tateoka | 92/29 |

FOREIGN PATENT DOCUMENTS 2428645 1/1978 Fed. Rep. of Germany.

Primary Examiner—Robert E. Garrett
Assistant Examiner—Richard S. Meyer
Attorney, Agent, or Firm—Kontler, Grimes & Battersby

[57] ABSTRACT

A servomotor which actuates the throw-out device of a clutch, particularly in an automotive vehicle, has a piston which is reciprocable in a housing and is adapted to be coupled to a reciprocable motion transmitting rod for the throw-out device by a compensating device having cylindrical rollers which establish a motion transmitting connection between the piston and the rod as soon as the piston leaves its starting position in response to evacuation of air from the housing at one side of the piston. The rollers are automatically disengaged from the rod when the piston returns to its starting position so that the rod can be moved by the clutch in a first direction to compensate for wear upon the parts of the clutch or in a second direction to compensate for expansion of one or more friction discs in the clutch.

17 Claims, 2 Drawing Figures

FLUID-OPERATED SERVOMOTOR FOR ACTUATION OF CLUTCHES OR THE LIKE

BACKGROUND OF THE INVENTION

The present invention relates to servomotors in general, and more particularly to improvements in fluid-operated servomotors which can be utilized to actuate various types of aggregates, such as clutches in automotive vehicles. Still more particularly, the invention relates to improvements in servomotors of the type wherein a mobile component can perform a working stroke in response to the application of positive or negative pressure and performs a return stroke when the positive or negative pressure is reduced sufficiently to enable a restoring force to effect a movement of the mobile component back to its starting position. As a rule, the mobile component constitutes or resembles a piston.

More specifically, the invention relates to a servomotor which is provided with a device capable of compensating for wear, swelling and/or other unpredictable phenomena of various parts and is installed between the aforementioned mobile component and an output element, for example, an element which can transmit translatory and/or another form of motion to the disengaging mechanism of a clutch in an automotive vehicle.

It is already known to provide or combine a servomotor with a compensating device of the above outlined character. Reference may be had to German Pat. No. 2,428,645 which discloses a compensating device serving to eliminate play between motion transmitting and motion receiving parts. Such parts may include or constitute the linkage in a brake or clutch. The patented compensating device comprises a feed screw which is rotatable relative to a nut or vice versa to thereby compensate for play between motion transmitting and motion receiving parts. As a rule, the nut is rotated relative to the feed screw. The means for rotating the nut is a mechanical device of substantial complexity so that not only the initial but also the maintenance cost of such compensating devices is quite high. Furthermore, the patented compensating device exhibits the drawback that it is adjustable in a single direction only, namely, in a direction to compensate for play between motion transmitting and motion receiving parts.

OBJECTS AND SUMMARY OF THE INVENTION

An object of the invention is to provide a novel and improved servomotor which is provided or combined with compensating means capable of compensating in two different directions.

Another object of the invention is to provide a fluid-operated servomotor of the above outlined character which is relatively simple, compact, inexpensive and requires a minimum of maintenance.

A further object of the invention is to provide a servomotor which can be utilized with advantage to transmit motion to the disengaging means of a clutch in an automotive vehicle, i.e., as a superior substitute for conventional throw-out devices.

Still another object of the invention is to provide a servomotor whose compensating means can automatically account for wear upon component parts of the machine or aggregate which is operated or actuated by the servomotor as well as for wear upon the component parts of the servomotor.

An additional object of the invention is to provide the servomotor with novel and improved means for automatically compensating for minute or substantial wear upon component parts in the machine or aggregate that receives motion from the servomotor or upon the parts of the servomotor itself.

A further object of the invention is to provide a fluid-operated servomotor of the above outlined character which can be utilized as a superior and more reliable substitute for heretofore known servomotors in automotive vehicles or the like.

Another object of the invention is to provide a servomotor which can be installed in an automotive vehicle to transmit motion to the clutch disengaging means in such a way that the vehicle requires a minimum of modifications in order to accept and utilize the improved servomotor.

The invention resides in the provision of a servomotor, particularly a servomotor for actuating the clutch of an automotive vehicle. The servomotor comprises a fluid-operated prime mover (e.g., a cylinder and piston unit whose cylinder is a stationary cupped housing and whose piston includes a membrane having a central opening and a marginal portion which is sealingly received between two interconnected sections of the housing) including a piston-like component movable from a starting position in a first direction and back to the starting position in a second direction counter to the first direction (the component can abut against a first portion of the housing in its starting position and against a second portion of the housing in an end position at a maximum distance from the starting position; this ensures that the component can invariably and repeatedly perform strokes of predetermined length), a motion transmitting member (e.g., an elongated rod-like member which is reciprocable, i.e., which acts linearly, in an automotive vehicle to transmit motion to the disengaging means of a friction clutch), motion resisting means which is operable to yieldably oppose the movements of the motion transmitting means in the first and second directions (such motion resisting means may include a friction clutch which is connected to the motion transmitting member and can include or embody one or more dished springs and/or other constituents which act or can act upon the motion transmitting member whenever the latter tends to move in the one or the other direction), and a compensating device which is interposed between the component and the motion transmitting member and includes means for coupling the component with the motion transmitting member in response to movement of the component from its starting position in the operative condition of the motion resisting means so that the motion transmitting member is normally free to move relative to the component only when the component assumes its starting position. This means that the motion transmitting member is free to move in the one and/or the other of the aforementioned first and second directions when the component assumes its starting position whereby the motion transmitting member can assume an initial position such as to compensate for eventual wear upon the parts which receive motion therefrom, to compensate for other changes in the condition and/or configuration of such parts (e.g., to compensate for swelling of one or more friction discs in a friction clutch whose disengaging mechanism is connected with the motion transmitting member), and/or to compensate for any other factors which entail its movement relative to the component when the latter is not coupled with the motion transmitting member.

The coupling means includes or may include a freewheel or a unit which acts not unlike a freewheel and is arranged to connect the motion transmitting member to the component when the latter leaves the starting position and to disconnect the motion transmitting member from the component not later than when the component returns to its starting position.

The component is preferably reciprocable in the first and second directions, and the motion transmitting member is preferably movable along a substantially straight path during movement of the component away from and back toward the starting position.

The servomotor preferably comprises means for securing the compensating device to the component so that the compensating device shares the movements of the component in the first and second directions.

The novel features which are considered as characteristic of the invention are set forth in particular in the appended claims. The improved servomotor itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
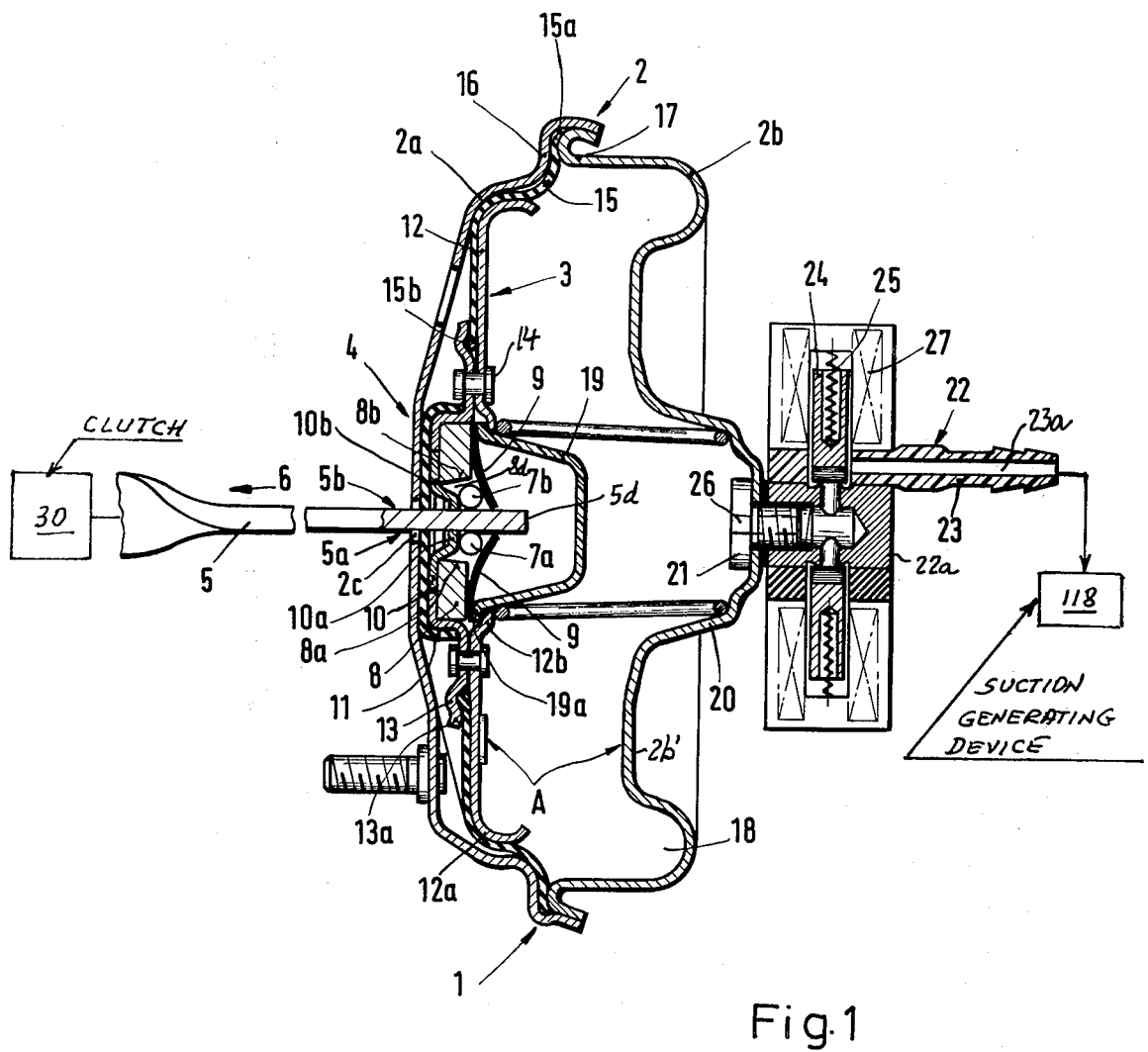
FIG. 1 is a central sectional view of a servomotor which is constructed and assembled in accordance with the invention, the piston of the prime mover of the servomotor being shown in its idle or starting position.

Referring first to FIG. 1, there is shown a fluid-operated servomotor 1 which comprises a prime mover including a housing or cylinder 2 and a piston-shaped component 3 (hereinafter called piston for short). The piston 3 carries a compensating device 4 which is constructed and assembled in accordance with a feature of the present invention. The compensating device 4 can reciprocate a motion transmitting member 5 which is preferably a flat steel bar the right-hand end portion 5d of which (as viewed in FIG. 1) has a substantially or exactly square or rectangular cross-sectional outline. The left-hand end portion of the motion transmitting member 5 can shift the disengaging means of a clutch 30 in an automotive vehicle. A clutch wherein the disengaging means can receive motion from the member 5 is described and shown, for example, in commonly owned allowed copending patent application Ser. No. 175,870 filed Aug. 6, 1980 by Paul Maucher et al. for "Friction Clutch" ,now U.S. Pat. No. 4,368,810 granted Jan. 18, 1983.

If the component parts of the clutch 30 undergo at least some or substantial wear, the member 5 is shifted in the direction indicated by an arrow 6. FIG. 1 shows the motion transmitting member 5 close to or in its initial or starting position, i.e., in a position it assumes when the wear upon the component parts of the clutch 30 is or approximates zero. If the component parts of the clutch 30 do not undergo any wear, it is possible that the motion transmitting member 5 will be shifted in a direction counter to that indicated by the arrow 6 shown in FIG. 1. Such situation can arise in response to swelling of one or more friction discs in the friction clutch 30. The device 4 is constructed and assembled in such a way that it can compensate for shifting of the motion transmitting member 5 in or counter to the direction indicated by the arrow 6.

The right-hand end portion 50 of the motion transmitting member 5 extends through an opening 2c in the cupped left-hand section 2a of the housing 2. The surface surrounding the opening 2c may but need not conform or substantially conform to the preferably square or rectangular cross-sectional outline of the right-hand end portion 5d of the motion transmitting member 5. The housing 2 further comprises a cupped second section 2b which is sealingly connected to the section 2a in the region of maximum-diameter portions 16 and 17 of the sections 2a, 2b, respectively. The piston 3 is installed in the interior of the housing 2 and is movable between the starting position of FIG. 1 in which it abuts against or is immediately adjacent to the section 2a and a second end position in which it abuts or is closely adjacent to a portion of the section 2b. The right-hand end portion 5d of the motion transmitting member 5 extends into the compensating device 4 which comprises two roller-shaped cylindrical clamping or coupling elements 7a, 7b respectively adjacent to the flat parallel external surfaces 5a and 5b of the end portion 5d of the motion transmitting member 5. If the member 5 has a rectangular or square right-hand end portion 5d, the surfaces 5a and 5b of such end portion are preferably located opposite each other. Coupling elements 7a, 7b in the form of cylinders are preferred at this time because they can be maintained in linear contact with the respective surfaces 5a and 5b of the motion transmitting member 5.

The compensating device 4 further comprises a clamping or gripping member 8 which is formed with two suitably inclined surfaces 8a and 8b. The surfaces 8a and 8b make relatively small acute angles with the respective surfaces 5a and 5b of the motion transmitting member 5. It will be noted that the surfaces 8a and 8b are respectively adjacent but spaced apart from the corresponding surfaces 5a and 5b of the right-hand end portion 5d of the motion transmitting member 5. The manner in which the inclined surfaces 8a and 8b can cooperate with the coupling elements 7a and 7b is similar to that between the so-called sprags of a one-way clutch and the corresponding surface or surfaces of such clutch. In other words, the compensating device 4 can cause the motion transmitting member 5 to participate in movements of the piston 3 in one direction but will be free to remain idle or to move independently of the piston 3 when the latter is moved in the opposite direction. The inclined surfaces 8a and 8b of the clamping member 8 slope toward the respective surfaces 5a and 5b of the motion transmitting member 5 in the direction which is indicated by the aforementioned arrow 6. The acute angles between the surfaces 8a, 8b on the one hand and the surfaces 5a, 5b on the other hand are sufficiently small to enable the elements 7a and 7b to transmit motion from the member 8 to the member 5 when the element 7a is wedged between the surfaces 5a, 7a and/or the element 7b is wedged between the surfaces 5b and 8b. In other words, the compensating device 4 can establish a self-locking motion transmitting connection between the parts 5 and 8. The surfaces 8a and 8b are provided in a centrally located recess or passage 8d of the clamping member 8. These surfaces are located opposite each other with reference to a symmetry plane which includes the axis of the servomotor 1 and is normal to the plane of FIG. 1.

The coupling elements 7a and 7b are confined or held against excessive movement relative to the surfaces 5a, 5b and 8a, 8b. The confining means for the elements 7a and 7b comprises a pair of biasing members in the form of leaf springs 9 the inner end portions of which bear against the respective coupling elements and the outer end portions of which are adjacent to the respective (right-hand) side of the clamping member 8. Such confinement of the elements 7a and 7b, as considered in the longitudinal direction of the motion transmitting member 5, is desirable and advantageous because it ensures that the movements of the piston 3 relative to the housing 2 of the servomotor 1 will suffice to effect activation or deactivation of the compensating device 4, i.e., they will ensure a predictable engagement between the clamping member 8 and the motion transmiting member 5 during certain stages of movement of the piston 3 relative to the housing 2 as well as in certain positions of the piston 3. The confining means for the elements 7a and 7b further comprises an abutment or stop 10 which is disposed at the left-hand sides of the elements 7a, 7b, namely, opposite the free inner end portions of the leaf springs 9, as considered in the axial direction of the servomotor 1. The outer end portions of the leaf springs 9 can be riveted to the adjacent portions of the clamping member 8. The inner end portions of the leaf springs 9 tend to move the elements 7a and 7b against the abutment 10 which has two projections 10a and 10b. The projections 10a, 10b are respectively engaged by and arrest the elements 7a and 7b when elements are free to follow the bias of the respective leaf springs 9 and move in a direction to the left as viewed in FIG. 1. The abutment 10 constitutes a means for disengaging the coupling elements 7a, 7b from the members 5, 8 in the starting position of the piston 3.

The abutment 10 may constitute a profiled sheet metal member which is formed with the aforementioned projections 10a and 10b extending into the central passage or recess 8d of the clamping member 8. The elements 7a and 7b abut against the corresponding projections 10a and 10b of the abutment 10, at least at such times when the piston 3 assumes the initial or starting position which is shown in FIG. 1, namely, a position which corresponds to minimal wear or no wear upon the parts of the clutch 30 the releasing means of which receives motion from the member 5. It is further assumed that, in the axial position of the member 5 shown in FIG. 1, no swelling of the friction disc or discs in the friction clutch 30 has taken place. When the projections 10a and 10b extend into the passage 8d of the clamping member 8 and abut against the respective coupling elements 7a and 7b and idle, i.e., the motion transmitting member 5 is free to move axially deeper into or out of the housing 2 of the servomotor 1. The leaf springs 9 then store energy and tend to push the corresponding elements 7a and 7b deeper into the central passage 8d of the clamping member 8, namely, these elements tend to establish a motion transmitting connection between the surfaces 5a, 5b on the one hand and the surfaces 8a, 8b on the other hand.

The abutment 10 is mounted on an elastic support 11 which resembles a dish and preferably consists of a suitable elastomeric synthetic plastic material. The mounting of the support 11 for the abutment 10 is preferably such that its outermost portion is held against movement with reference to the clamping member 8, as considered in the axial direction of the piston 3. The support 11 connects the coupling member 8 to the piston 3.

The piston 3 comprises a ring-shaped supporting portion 12 which carries the compensating device 4. The connection between the portion 12 and the compensating device 4 comprises a sheet-metal carrier 13 which is secured to the portion 12 by rivets 14. The piston 3 further comprises a membrane 15 having a radially outermost portion or peripheral portion 15a which is sealingly held between the portions 16 and 17 of the housing sections 2a and 2b. The radially innermost portion 15b of the membrane 15 is connected with the ring-shaped supporting portion 12 of the piston 3. As shown in FIG. 1, the radially outermost portion 13a of the sheet metal carrier 13 clampingly engages the radially innermost portion 15b of the membrane 15. The portion 15b is preferably formed with or constitutes a bead so that it can be more readily engaged and sealingly deformed by the clamping portion 13a of the carrier 13. The rivets 14 connect the portion 12 of the piston 3 to the portion 13a of the carrier 13.

Figure 2:
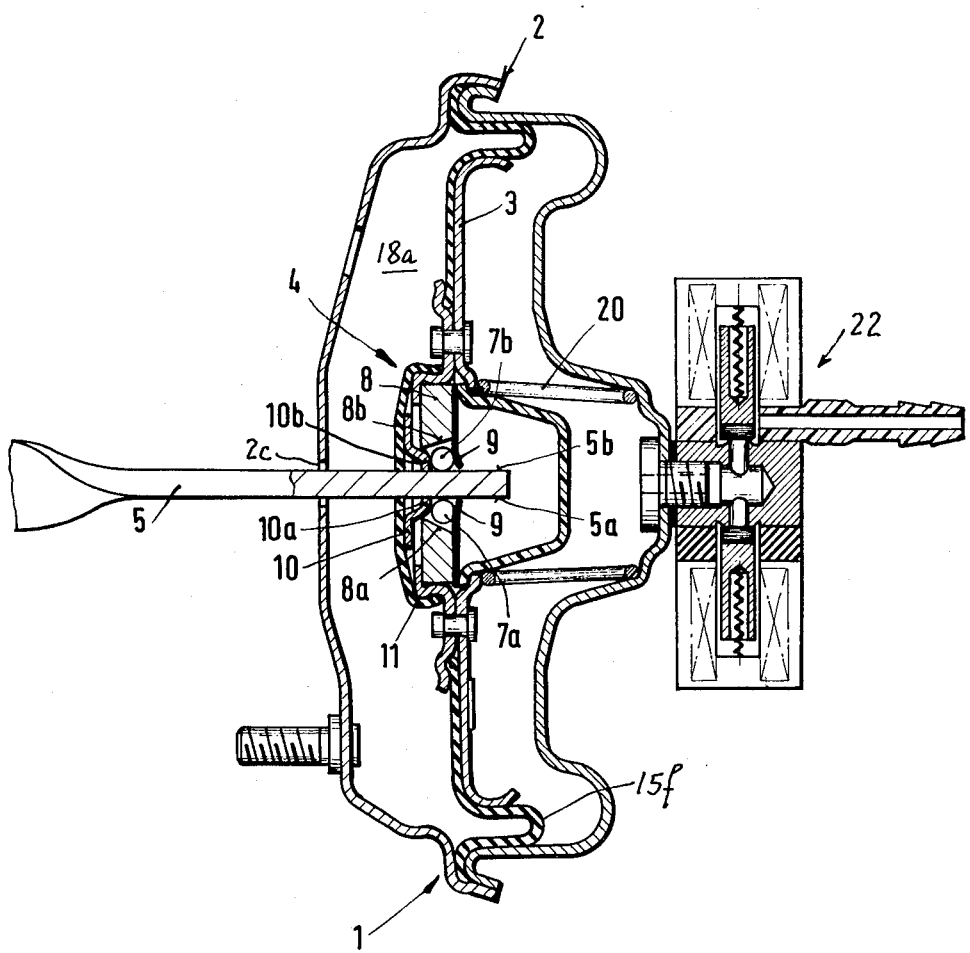
FIG. 2. is a similar sectional view of the servomotor but showing the piston in a different position.

The radially outermost part 12a of the supporting portion 12 of the piston 3 extends in the axial direction of the housing 2 (i.e., the part 12a constitutes a relatively short cylinder) and serves as an abutment or support for the adjacent portion of the membrane 15. The membrane 15 can follow the outline of the part 12a during axial movement of the piston 3 relative to the housing 2. When the membrane 15 moves from the position of FIG. 1 toward and beyond the position which is shown in FIG. 2, a portion thereof between the portions 16, 17 of the housing sections 2a and 2b and the cylindrical portion 12a defines one or more ring-shaped corrugations one of which is shown in FIG. 2, as at 15f. It can be said that the membrane 15 resembles a bellows and the portion 12 of the piston 3 serves as a support or base for the adjacent portions of the membrane.

The piston 3 and the housing section 2b define a suction chamber 18 which is normally sealed from the surrounding atmosphere in order to prevent penetration of atmospheric air into the chamber 18 along the external surfaces of the motion transmitting member 5. The central portion of the piston 3 comprises or includes a cupped sealing member 19 which is secured to the piston portion 12. The rightmost portion 5d of the motion transmitting member 5 extends with substantial clearance into the interior of the sealing member 19. The marginal portion of the member 19 has a circumferential bead 19a which is sealingly engaged by the clamping member 8 of the compensating device 4 and by the innermost part 12b of the piston portion 12.

A coil spring 20 is installed in the suction chamber 18 to constitute an energy storing device which tends to automatically return the piston 3 to the end position shown in FIG. 1. To this end, the right-hand end convolution of the spring 20 reacts against an adjacent internal shoulder of the housing 2b, and the left-hand end convolution of the spring 20 bears against the innermost part 12b of the piston portion 12. Since the compensating device 4 shares all axial movements of the piston 3, the spring 20 can be said to constitute a means for normally maintaining the compensating device 4 in disengaged or inoperative position.

When the servomotor 1 is idle, its parts assume the positions which are shown in FIG. 1. The elastic support 11 for the abutment 10 is then confined between the housing section 2a and the piston 3 under the action of the coil spring 20. In such position of the abutment 10, its projections 10a and 10b extend into the central passage 8d of the clamping member 8 so that they hold the corresponding coupling elements 7a and 7b against pronounced or any frictional engagement with the inclined surfaces 8a and 8b of the clamping member 8. In other words, the projections 10a and 10b cause the corresponding leaf springs 9 to store energy. Consequently, the compensating device 4 is idle or inoperative and the motion transmitting member 5 can be moved axially in or counter to the direction indicated by the arrow 6. This ensures that the motion transmitting member 5 can compensate for wear upon the parts of the servomotor 1 and/or upon the parts of the clutch 30 which receives motion from the member 5. At the same time, the motion transmitting member 5 can compensate for eventual swelling of one or more friction discs in the clutch 30.

In order to ensure that the coupling elements 7a and 7b will be held out of any or out of pronounced frictional engagement with the surfaces 8a and 8b of the clamping member 8, the bias of the coil spring 20 must exceed the combined bias of the leaf springs 9 and elastic support 11 for the abutment 10.

The central portion of the housing section 2b is formed with an axial opening for the flange of an air evacuating nipple 21 which has an axial bore 26 and is connected to the housing or body 22a of a valve 22. The flange of the nipple 21 is preferably welded or soldered to the adjacent portion of the housing section 2b so as to ensure that the suction chamber 18 can communicate with the exterior of the housing 2 exclusively by way of the axial bore 26. The valve 22 is preferably a solenoid-operated valve having an energizable coil 27 which can effect axial movements of one or more valving elements 24 extending substantially radially of the nipple 21. The valving elements 24 are biased to the illustrated sealing positions by springs 25 which normally ensure that the bore 26 of the nipple 21 is sealed from the axial bore 23a of a pipe 23 serving to connect the valve 22 with a suction generating device 118, for example, a fan of any known design. When the coil 27 is energized, the valving elements 24 are moved radially outwardly against the opposition of the respective springs 25 whereby the suction chamber 18 is connected with the suction generating device 118 by way of the bore 26 of the nipple 21, the openings which are surrounded by the seats for the valving elements 24, and the bore 23a of the pipe 23. It will be seen that, when the servomotor 1 cooperates with the illustrated solenoid-operated valve 22, the pressure in the suction chamber 18 is maintained below atmospheric pressure as long as the coil or coils 27 of the valve 22 remain energized.

Clutches with friction discs which are likely to swell and to thereby effect the movement of the throw-out device in one direction, and wherein wear upon the parts necessitates an adjustment of the throw-out device in the opposite direction are disclosed, for example, in U.S. Pat. Nos. 2,138,169 to Hunt, U.S. Pat. No. 2,385,517 to Hunt, U.S. Pat. No. 2,835,366 to Häussermann, U.S. Pat. No. 3,016,120 to Häussermann et al., and U.S. Pat. No. 3,323,624 to Maurice. The disclosures of these patents are incorporated herein by reference. Such or analogous clutches can be used with the motion transmitting member 5 as a motion resisting means which acts upon the member 5 during movement of the piston 3 from and back toward the starting position of FIG. 1 in order to ensure retention of the coupling elements 7a, 7b in requisite engagement with the respective surfaces 5a, 8a and 5b, 8b whenever the piston 3 is out of its starting position. Once the piston 3 returns to the starting position of FIG. 1, the clutch is free to move the motion transmitting member 5 in the direction of arrow 6 or counter to such direction (depending on the nature of the necessary adjustment or compensation) because the compensating device 4 is then ineffective, i.e., the device 4 allows the motion transmitting member 5 to move lengthwise in either direction. The length of strokes which the motion transmitting member 5 performs while the piston 3 moves from the starting position of FIG. 1 to the other end position in which it abuts against the portion 2b' of the housing section 2b and back to the starting position of FIG. 1 is always the same, i.e., the length of such strokes is not affected by any wear upon the parts of the clutch and/or by expansion of certain parts of the clutch because such parameters are compensated for by shifting of the motion transmitting member 5 relative to the piston 3 while the latter is held in the starting position of FIG. 1 and the compensating device 4 is ineffective, i.e., while the member 5 is free to move relative to the piston 3 in a direction to the right or to the left, as viewed in FIG. 1.

The cylindrical coupling elements 7a, 7b can be replaced with barrel-shaped or spherical coupling elements. However, cylindrical coupling elements are preferred at this time, especially when the motion transmitting member 5 has an end portion 5d with two parallel surfaces 5a, 5b, because the elements 7a, 7b are then in linear contact with the respective surfaces 5a, 5b. This reduces the stresses upon the member 5, i.e., instead of undergoing extremely or very high localized stresses in regions where spherical or like coupling elements are in contact with its surfaces, the material of the member 5 must stand much less pronounced stresses along the lines of contact between its surfaces and the peripheral surfaces of cylindrical coupling elements.

It is further clear that the motion transmitting member 5 can cooperate with a compensating device with three, four or more spherical, cylindrical barrel-shaped or otherwise configurated coupling elements, depending on the cross-sectional configuration of its end portion 5d. It has been found that two coupling elements suffice to ensure adequate engagement between the compensating device 4 and the motion transmitting member 5 so that the member 5 is compelled to share all movements of the piston 3 when the latter is out of the starting position shown in FIG. 1, as long as the motion resisting means (clutch 30 or an analogous clutch) is operative to yieldably oppose the movement of the piston 3 (and hence of the motion transmitting member 5) in or counter to the direction which is indicated by the arrow 6.

It is also clear that, at least under certain circumstances, a single spherical, cylindrical or otherwise configurated coupling element will suffice to establish a satisfactory connection between the motion transmitting member 5 and the piston 3. However, the utilization of a motion transmitting member having an end portion 5d with a rectangular or square cross-sectional outline (so that the surfaces 5a and 5b are parallel to and disposed opposite each other) and the utilization of a compensating device 4 with two preferably cylindrical coupling elements 7a and 7b is preferred at this time because the frictional engagement between the peripheral surfaces of the coupling elements 7a, 7b and the respective surface pairs 5a, 8a and 5b, 8b is particularly effective. This will be readily appreciated since the coupling elements 7a, 7b are mirror symmetrical to each other with reference to a plane which is normal to the plane of FIG. 1 and includes the axis of the prime mover 2, 3. Therefore, flexing of the end poriton 5d in a downward direction, as viewed in FIG. 1, by the coupling element 7b (when the latter is wedged between the surfaces 5b and 8b)is opposed by the coupling element 7a (when the latter is wedged between the surfaces 5a, 8a) and vice versa.

The housing section 2a deforms the elastomeric support 11 and thereby causes the abutment or stop 10 to move gradually nearer to the coupling member 8 during the last stage of movement of the piston 3 back to the starting position of FIG. 1. This ensures that the projections 10a, 10b reliably disengage the coupling elements 7a, 7b from the respective surface pairs 5a, 8a and 5b, 8b not later than when the piston 3 reassumes its starting position, i.e., the compensating device 4 is then ineffective in the sense that it ceases to positively couple the motion transmitting member 5 to the piston 3 but is effective in a different sense, namely, it allows the motion transmitting member 5 to follow the bias of the clutch 30 and to move relative to the piston 3, either in or counter to the direction which is indicated by the arrow 6. In other words, the abutment 10 cooperates with the housing section 2a to reliably disconnect the motion transmitting member 5 from the piston 3 (as a result of deformation of the elastomeric support 11 by the housing section 2a) not later than when the piston 3 reassumes the starting position of FIG. 1. The projections 10a, 10b of the abutment 10 continue to maintain the coupling elements 7a, 7b out of any or out of pronounced frictional engagement with the respective surface pairs 5a, 8a and 5b, 8b as long as the piston 3 remains in the starting position of FIG. 1 because the bias of the spring 20 is sufficiently pronounced to enable the piston 3 to maintain the support 11 in deformed condition (so that the projections 10a, 10b extend into the recess 8d of the coupling member 8 and cause the coupling elements 7a, 7b to deform the respective leaf springs 9) as long as the pressure in the chamber 18 is sufficiently high, i.e., as long as the valve 22 is closed to prevent evacuation of air from the chamber 18 via pipe 23. The locking or clamping or wedging action which causes the motion transmitting member 5 to share the movements of the piston 3 is reestablished in a fully automatic way as soon as the piston 3 leaves the starting position of FIG. 1 because the support 11 is then free to reassume its undeformed condition as a result of movement of the piston 3 away from the housing section 2a whereby the projections 10a, 10b are retracted from the recess 8d and the leaf springs 9 are free to return the coupling elements 7a, 7b into requisite frictional engagement with the respective surface pairs 5a, 8a and 5b, 8b.

The dished elastomeric support 11 and the abutment 10 can be replaced with an abutment which is rigidly connected with the housing section 2a and has projections (corresponding to the projections 10a, 10b) which penetrate into the recess 8d of the coupling member 8 to disengage the coupling elements 7a, 7b from the respective surface pairs when the piston 3 approaches its starting position. The mounting of abutment 10 on the piston 3 by means of an elastomeric support (11) is preferred at this time because the entire compensating device 4 (such device can be said to include the parts 10, 11) can be removed from the interior of the housing 2 by the simple expedient of separating the sections 2a, 2b from each other so that the marginal portion 15a of the membrane 15 is released by the portions 16, 17 of the respective housing sections.

The prime mover 2, 3 of the servomotor 1 can be operated by suction or by resorting to a pressurized fluid. The operation of a thus modified prime mover is clearly analogous to the operation of the prime mover which is shown in FIGS. 1 and 2, i.e., all that is necessary is to admit pressurized fluid into the chamber 18a between the piston 3 and the housing section 2a (the chamber 18a is then sealed from the surrounding atmosphere) and to establish a path for the flow of atmospheric air into and from the chamber 18. The membrane 15 of the piston 3 also constitutes an optional (but desirable and advantageous) feature of the illustrated servomotor. If the housing 2 is replaced with a truly cylindrical body, the piston 3 can be replaced with a plunger whose peripheral surface is in sealing engagement with and is slidable along the internal surface of the cylindrical body. The compensating device 4 is then mounted directly on the plunger.

The cupped sealing member 19 of the plunger 1 may but need not be rigid. All that counts is that it can properly seal the central opening of the membrane 15 from the suction chamber 18 and that it provides room for the end portion 5d of the motion transmitting member 5, i.e., for that portion of the member 5 which extends through and beyond the compensating device 4. It will be noted that the sealing member 19 is located at the suction side of the piston 3, i.e., between the piston and the housing section 2b.

The operation of the servomotor 1 and its compensating device 4 is as follows:

In order to be capable of shifting the disengaging means of the clutch 30 through the medium of the motion transmitting member 5 in or counter to the direction indicated by the arrow 6, the coil 27 of the solenoid operated valve 22 is energized so that the valving elements 24 are moved radially outwardly against the opposition of the respective springs 25 and permit air to flow from the interior of the suction chamber 18 to the intake of the suction generating device 118. As the pressure in the suction chamber 18 decreases, the piston 3 moves in a direction to the right, as viewed in FIG. 1, toward and beyond the intermediate position shown in FIG. 2. The piston 3 entrains the compensating device 4 which moves away from the cupped section 2a and toward the cupped section 2b of the housing 2. The spring 20 stores energy. During the initial stage of movement of the piston 3 from its starting position and toward the housing section 2b, the elastomeric support 11 for the abutment 10 moves axially of and slightly away from the clamping member 8. This causes the coupling elements 7a and 7b to respectively move against the inclined surfaces 8a and 8b under the action of the corresponding leaf springs 9. The movement of coupling elements 7a and 7b is terminated when they are respectively wedged between the surfaces 5a, 8a and 5b, 8b. This establishes a self-locking connection between the motion transmitting member 5 and the clamping member 8 of the compensating device 4. Evacuation of air from the suction chamber 18 continues whereby the piston 3 continues to move toward the housing section 2b, and the motion transmitting member 5 begins to share the movement of the compensating device 4 in a direction counter to that indicated by the arrow 6. The movement of the piston 3 and motion transmitting member 5 is terminated when the portion 12 of the piston 3 abuts against the portion 2b' of the housing section 2b. The right-hand side of the portion 12 can be provided with a coat or film of wear-resistant material which abuts against the portion 2b' in the right-hand end position of the piston 3. The locations where the portions 2b' and 12 abut against each other in the just mentioned right-hand end position of the piston 3 are indicated by the arrows A. The clutch 30 is assumed to be disengaged when the piston 3 abuts against the housing section 2b and the clutch 30 remains disengaged as long as the suction chamber 18 remains connected with the intake of the suction generating device 118, i.e., as long as the valve 22 establishes a path for the flow of fluid from the chamber 18 into the bore 23a of the pipe 23.

If the operator of the vehicle desires to reengage the clutch 30, the coil or coils 27 of the valve 22 are deenergized so that the springs 25 can return the corresponding valving elements 24 to sealing positions in which the path for the flow of gaseous fluid from the chamber 18 to the suction generating device 118 is interrupted. The spring 20 is then free to expand and to push the piston 3 from the right-hand end position, through the intermediate position of FIG. 2, and back to the starting or left-hand end position which is shown in FIG. 1. The motion transmitting member 5 moves in a direction to the left (see the arrow 6 in FIG. 1) under the action of the parts of the clutch 30, namely, of the parts which are connected to the left-hand end portion of the member 5, as well as due to leftward movement of the compensating device 4. As the piston 3 approaches the starting position of FIG. 1, the elastic support 11 is deformed so that the abutment 10 moves its projections 10a and 10b into the passage 8d of the clamping member 8 and disengages the respective coupling elements 7a and 7b from the adjacent inclined surfaces 8a and 8b. In other words, the compensating device 4 then permits the motion transmitting member 5 to move axially with respect to the claming member 8. At such time, the motion transmitting member 5 can assume an axial position which accounts for eventual wear upon the parts of the clutch 30 and/or for eventual swelling of one or more friction discs in the clutch 30.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A servomotor, particularly for actuating the clutch of an automotive vehicle, comprising a fluid-operated prime mover including a component movable from a starting position in a first direction and back to the starting position in a second direction counter to said first direction; a motion transmitting member having a first surface; motion resisting means operable to yieldably oppose the movements of said member in said first and second directions; and a compensating device interposed between said component and said member, said device including means for coupling said component with said member in response to movement of said component from and toward said starting position so that said member is normally free to move relative to said component only when the latter assumes said starting position, said coupling means including a coupling member having a second surface spaced apart from said first surface, a coupling element interposed between said surfaces and means for biasing said coupling element against said surfaces to thereby couple said members to each other in response to movement of said component from the starting position, said compensating device further comprising means for disengaging said coupling element from at least one of said surfaces in the starting position of said component and said disengaging means comprising a portion arranged to extend between said surfaces and to disengage said coupling element from said one surface in response to movement of said component to said starting position.

2. The servomotor of claim 1, wherein said coupling means constitutes a one-way clutch arranged to connect said motion transmitting member to said component when said component leaves the starting position and to disconnect said motion transmitting member from said component not later than when the component returns to said starting position.

3. The servomotor of claim 2, wherein said component is reciprocable in said first and second directions and said motion transmitting member is movable with said component along a substantially straight path during movement of said component away from and back toward said starting position.

4. The servomotor of claim 1, further comprising means for securing said device to said component so that the device shares the movements of said component in said first and second directions.

5. The servomotor of claim 1, wherein said motion resisting means comprises a friction clutch.

6. The servomotor of claim 1, wherein said coupling element is a rotatable element.

7. The servomotor of claim 6, wherein said rotatable element is a substantially cylindrical roller.

8. The servomotor of claim 1, wherein said surfaces are inclined with reference to each other and said biasing means is arranged to urge said coupling element between said surfaces in a direction to wedge such element between said members in response to movement of said component from said starting position and while said component is out of such starting position.

9. The servomotor of claim 1, wherein said device further comprises means for movably connecting said projection to said component.

10. The servomotor of claim 9, wherein said connecting means comprises a substantially dished elastic support arranged to normally urge said projection to an idle position in which said biasing means is free to maintain the coupling element in engagement with both said surfaces, and further comprising means for moving said projection from said idle position and into engagement with said coupling element with attendant deformation of said support in response to return movement of said component to said starting position.

11. The servomotor of claim 10, wherein said prime mover includes a housing for said component and said housing includes a portion which constitutes said means for moving said projection.

12. The servomotor of claim 10, wherein said support consists of synthetic plastic material.

13. The servomotor of claim 1, wherein said prime mover further includes a cylinder for said component and means for evacuating air from said cylinder to thereby move said component from said starting position.

14. The servomotor of claim 13, wherein said component comprises a membrane and said device is connected to said membrane.

15. The servomotor of claim 14, wherein said motion transmitting member is an elongated rod having an end portion extending through said device and into said cylinder, said membrane having an opening through which said end portion extends and said component further comprising a sealing member connected with said membrane around said opening and spacedly receiving the end portion of said motion transmitting member.

16. The servomotor of claim 1, wherein said prime mover further comprises a stationary housing for said component and said device.

17. The servomotor of claim 16, wherein said housing includes two sections and said component is a piston having a membrane comprising a marginal portion which is sealingly received between said sections.

* * * * *